Figure 1:
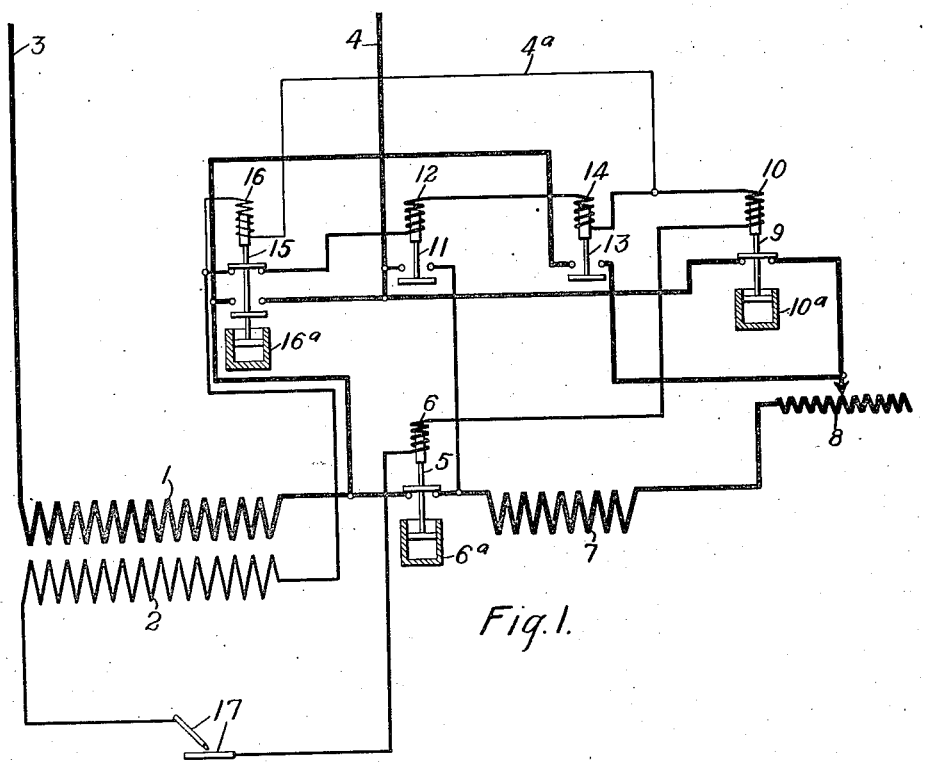

O. H. ESCHHOLZ.
ELECTRIC ARC WELDING SYSTEM.
APPLICATION FILED NOV. 24, 1919.

1,343,207. Patented June 15, 1920.

WITNESSES:
J. A. Helsel
W. H. Woodman

INVENTOR
Otto H. Eschholz.
BY
Chesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,343,207.  Specification of Letters Patent.  Patented June 15, 1920.

Application filed November 24, 1919. Serial No. 340,395.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Electric-Arc-Welding Systems, of which the following is a specification.

My invention relates to arc welding systems and, more particularly, to welding systems employing alternating current and it has, for its primary object, the provision of welding systems, of the above designated character, which shall possess good starting and operating characteristics.

It is well known that alternating-current welding systems possess certain desirable advantages, such as portability, relatively low cost of installation and good penetrating qualities. However, alternating-current systems also possess certain undesirable features which have greatly limited the extent of their application. For example, it is relatively difficult, even for an experienced operator, to establish an arc by means of alternating current and this difficulty is believed to exist because of the reversals of current. I have found that the starting characteristics may be greatly improved if a relatively high voltage is employed during the period of establishing the arc. The employment of a relatively high voltage, however, introduces a shock hazard to the operator which is also undesirable.

One object of my invention is to provide alternating-current welding systems in which good starting characteristics shall obtain without the introduction of shock hazard to the operator.

My invention broadly comprises providing means, in an alternating-current welding system, for materially increasing the normal operating voltage during the period of establishing the arc and means for insuring a low open-circuit voltage; that is, a low voltage between the electrodes when no welding is being done.

With these and other objects in view, my invention will be more fully described, illustrated in the drawings, in the several views of which corresponding numerals indicate like parts, and then particularly pointed out in the claims.

Figure 2:
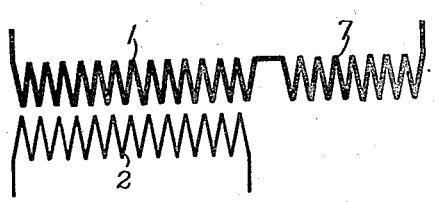
Figure 3:
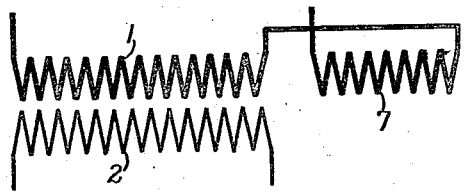
Figure 4:
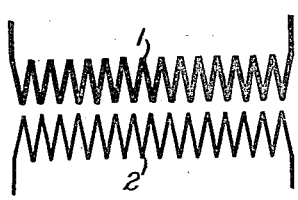

In the drawings, Figure 1 is a diagram of a welding system embodying my invention; Fig. 2 is a diagram illustrating certain electrical connections which obtain in the welding system shown in Fig. 1, under open-circuit conditions; Fig. 3 is a diagram, similar to Fig. 2, illustrating the electrical connections which obtain during the period of establishing an arc, and Fig. 4 is a diagram illustrating the connections which obtain under welding conditions.

In Fig. 1 is shown a welding system comprising a transformer having a primary winding 1 and a secondary winding 2, the primary winding of which is adapted to be connected, by conductors 3 and 4, to a suitable alternating-current supply circuit (not shown). A switch 5, having an actuating coil 6 and a retarding means $6^a$, is connected to one terminal of the primary winding 1 and to an auxiliary winding 7, which, in turn, is connected to a variable resistor 8. The resistor 8 is connected in series with the conductor 4 through a switch 9, having an actuating coil 10 and a retarding means $10^a$. A switch 11 having an actuating coil 12, controls a shunt circuit for the auxiliary winding 7, and another switch 13, having an actuating coil 14, controls a shunt circuit for the auxiliary winding 7 and the variable resistor 8. A switch 15, having an actuating coil 16 and a retarding means $16^a$, has a plurality of bridging members, one of which is connected in circuit with the coils 12 and 14 of the switches 11 and 13, respectively, and the other of which is connected to one terminal of the primary winding 1 and to the conductor 4. The secondary winding 2 is connected to a plurality of electrodes 17 and in series with the various actuating coils 6, 10, 12, 14 and 16. The coil 16 is connected to the coil 10 by a conductor $4^a$, which provides a shunt circuit for the coils 12 and 14.

In operating the above described welding system, the conductors 3 and 4 are connected to a suitable alternating-current supply circuit, and the switches 5 and 9 normally close the circuit through the primary winding 1, the auxiliary winding 7 and the variable resistor 8 to the conductors 3 and 4. It will be appreciated that, under these conditions, the auxiliary winding 7 is connected in series with the primary winding 1 and, therefore, increases the number of turns of the primary winding and reduces the voltage per turn therein. The voltage may be further reduced by adjusting the variable resistor 8 to reduce the current drawn by the primary winding 1 and thus obtain any desired voltage across the secondary winding 2. The connections which obtain between the primary winding 1 and the auxiliary winding 7, under open-circuit conditions, are shown in Fig. 2.

When the electrodes 17 are engaged, preliminarily to establishing an arc, all of the actuating coils of the switches are, at once, energized and the switches 11 and 13 are immediately closed while the switches 5, 9 and 15 remain in their initial closed positions for a short interval of time, governed by the respective retarding means secured thereto.

A short time after the electrodes become engaged, the switches 5 and 9 open, while the switch 15 still remains as shown, the electrical connections which exist being shown in Fig. 3, and the connection of the auxiliary winding 7, to the primary winding 1, being the reverse of its connection thereto under open-circuit conditions. The auxiliary winding 7, therefore, establishes a flux which opposes that established by the primary winding 1 which, in effect, is the same as reducing the number of turns in the primary winding 1, thus increasing the voltage per turn therein. A higher voltage will, consequently, be available between the electrodes 17, which will facilitate the establishment of an arc.

During the period that the winding 7 is connected in opposition to the primary winding 1, the electrodes are separated and an arc is established. A short time after the switches 5 and 9 open, the switch 15 closes the circuit between the primary winding 1 and the conductor 4 and opens the circuit of the actuating coils 12 and 14 of the switches 11 and 13. The switches 11 and 13 open when their coils are deënergized, and the primary winding is directly connected to the conductors 3 and 4. The electrical connections which obtain, under these conditions, are shown in Fig. 4. The system is now in normal operating condition and remains in this condition so long as the arc is maintained and welding is being performed.

If, for any reason, the arc is interrupted, thereby opening the secondary circuit, the coils 6, 10 and 16 are deënergized and the switches 5 and 9 connect the primary winding 1, the auxiliary winding 7 and the variable resistor 8 in series with the line conductor 4. The switch 15 assumes its normal position and closes the circuit to the actuating coils 12 and 14 of the switches 11 and 13 and opens the circuit from the primary winding 1 to the conductor 4. It will be appreciated, therefore, that, immediately upon rupture of the arc and opening of the secondary circuit, the auxiliary winding 7 and the variable resistor 8 are inserted in the primary circuit, and a relatively low voltage is, consequently, available across the secondary winding 2.

The variable resistor is employed not only to insure a desirable value of voltage between the electrodes, under open-circuit conditions, but also to decrease the short-circuit current which may traverse the shunt circuit controlled by the switches 11 and 13. It will be appreciated that it is necessary to close the switches 11 and 13 before switches 5 and 9 are opened, in order to maintain the continuity of the primary circuit. This is also true of the operation of the switch 15 which should be closed before the switches 11 and 13 are opened.

It will be apparent from the foregoing description that I have provided a welding system in which positive protection is provided for the operator against shock hazard and one which does not require his attention in order to function properly. Shock hazard cannot be introduced by carelessness on the part of the operator and, furthermore, he may give his entire attention to the production of good welds because of the automatic operation of the system to establish the various operating connections. Good starting characteristics are insured by providing a relatively high voltage during the period of establishing the arc, which voltage is automatically reduced to a suitable value for normal operating conditions. All the essentials of an efficient and easily operated welding system are, therefore, embodied in the system above described.

Although I have shown and specifically described a welding system which embodies my invention, it is obvious that minor changes may be made in the connections of the elements of the system and in the elements employed to obtain the desired results without departing from the spirit or scope of my invention. I desire, therefore, that no limitations shall be imposed upon my invention except such as are indicated in the appended claims.

I claim as my invention:—

1. An arc welding system comprising a transformer having primary and secondary windings, a plurality of electrodes connected to the secondary winding, an auxiliary winding, means for connecting the auxiliary winding in series with the primary winding under open-circuit conditions, and means for connecting the auxiliary winding in opposition to the primary winding when the electrodes are engaged.

2. An arc welding system comprising a transformer having primary and secondary windings, a plurality of electrodes connected to the secondary winding, an auxiliary winding, means controlled by the secondary current for connecting the auxiliary winding in series with the primary winding under open-circuit conditions, and means for connecting the auxiliary winding in opposition to the primary winding when the electrodes are engaged.

3. An arc welding system comprising a transformer having primary and secondary windings, a plurality of electrodes connected to the secondary winding, an auxiliary winding, means controlled by the secondary current for connecting the auxiliary winding in series with the primary winding under open-circuit conditions, and means, controlled by the secondary current, for connecting the auxiliary winding in opposition to the primary winding when the electrodes are engaged.

4. An arc welding system comprising a transformer having primary and secondary windings, a plurality of electrodes connected to the secondary winding, an auxiliary winding, means for connecting the auxiliary winding in series with the primary winding under open-circuit conditions, means for connecting the auxiliary winding in opposition to the primary winding when the electrodes are engaged, and means for shunting the auxiliary winding from the primary circuit under operating conditions.

5. An arc welding system comprising a transformer having primary and secondary windings, a plurality of electrodes connected to the secondary winding, an auxiliary winding, means for connecting the auxiliary winding in series with the primary winding under open-circuit conditions, means for connecting the auxiliary winding in opposition to the primary winding when the electrodes are engaged, and means, controlled by the secondary current, for shunting the auxiliary winding from the primary circuit under operating conditions.

6. An arc welding system comprising a transformer having primary and secondary windings, an auxiliary winding connected in series with the primary winding under open-circuit conditions, a variable resistor connected in series with the primary winding, a plurality of electrodes connected to the secondary winding, means for connecting the auxiliary winding in opposition to the primary winding when the electrodes are engaged, and means for shunting the auxiliary winding and the resistor from the primary circuit under operating conditions.

7. An arc welding system comprising a transformer having primary and secondary windings, an auxiliary winding connected in series with the primary winding under open-circuit conditions, a plurality of electrodes connected to the secondary winding, a plurality of switches, having actuating coils energized by the secondary current, which are operable to connect the auxiliary winding in opposition to the primary winding, and a switch, having an actuating coil energized by the secondary current, which is operable to shunt the auxiliary winding from the primary circuit.

8. An arc welding system comprising a transformer having primary and secondary windings, an auxiliary winding connected in series with the primary winding under open-circuit conditions, a plurality of electrodes connected to the secondary winding, a plurality of switches, having actuating coils energized by the secondary current, which are operable to connect the auxiliary winding in opposition to the primary winding, a switch, having an actuating coil energized by the secondary current, which is operable to shunt the auxiliary winding from the primary circuit, and retarding means for delaying the action of the last mentioned switch.

In testimony whereof I have hereunto subscribed my name this 18th day of November, 1919.

OTTO H. ESCHHOLZ.